United States Patent Office 2,866,808
Patented Dec. 30, 1958

2,866,808

CHEMICAL PROCESS FOR PRODUCING TRI($\beta$-HALOALIPHATIC) ESTERS OF PHOSPHORUS ACIDS

Alfred J. Kolka, Birmingham, Mich., assignor to Ethyl Corporation, New York, N. Y., a corporation of Delaware No Drawing. Application August 4, 1954
Serial No. 447,917

15 Claims. (Cl. 260—461)

This invention relates particularly to the manufacture of tri-($\beta$-haloaliphatic)-esters of monomeric acids of phosphorus and to the esters produced.

The above esters fall within two categories, tri-($\beta$-haloaliphatic)-esters of monomeric acids of trivalent phosphorus and the corresponding esters of pentavalent phosphorus. The former group consists of tri-($\beta$-haloaliphatic)-phosphites and thiophosphites, that is, neutral $\beta$-haloaliphatic esters of the phosphorus acids $(HO)_3P$, $(HO)_2(HS)P$, $(HO)(HS)_2P$, and $(HS)_3P$. The latter group consists of tri-($\beta$-haloaliphatic)-phosphates, -thiophosphates, -thionophosphates, and -thiothionophosphates, the prefix "thio" designating sulfur atoms which are singly bonded to phosphorus whereas "thiono" refers to a sulfur atom bonded to phosphorus by a coordinate covalent double bond. The tri-($\beta$-haloaliphatic)-esters of monomeric acids of pentavalent phosphorus are thus derivatives of the acids $(HO)_3P=O$, $(HO)_2(HS)P=O$, $(HO)(HS)_2P=O$, $(HS)_3P=O$
$(HO)_3P=S$, $(HO)_2(HS)P=S$, $(HO)(HS)_2P=S$ and $(HS)_3P=S$.

Tri-($\beta$-haloaliphatic)esters of monomeric acids of phosphorus are useful in formulating crankcase and extreme pressure lubricants, and as gasoline additives. In the latter capacity, such lesters act as ignition control compounds because of their capability of reducing pre-ignition, autoignition, spark plug fouling, and other similar deposit-induced engine problems. The esters in question also find utility as flame-proofing agents, plasticizers, antioxidants, cracking catalysts, impregnating and softening agents and the like, whether used directly for this purpose or used in the manufacture of compounds to be so used.

An object of this invention is to provide a process for the manufacture of tri-esters of monomeric acids of phosphorus, particularly $\beta$-haloaliphatic esters of such acids. Another object is to provide an improved process for the manufacture of halogenated trialiphatic esters of monomeric acids of phosphorus in which the aliphatic portions are substituted on the beta carbon atom with halogen atoms. Likewise, an object of my invention is to provide substantially pure tri-($\beta$-halo-aliphatic)-esters of monomeric acids of phosphorus. Still another object of this invention is that of providing processes for the preparation of tri-($\beta$-haloalkyl)-esters of monomeric phosphorus acids in which the halogen atoms each have an atomic weight between 30 and 80. An additional object is to provide substantially pure tri-($\beta$-haloalkyl)-esters of monomeric acids of phosphorus in which the halogens have atomic weights between 30 and 80. Other objects will become apparent from the ensuing description.

According to one aspect of this invention, above and other objects are accomplished by a process of preparing a tri-($\beta$-haloaliphatic)-ester of a monomeric acid of phosphorus which comprises reacting at a temperature between about 0° and about 100° C. in the presence of an amine as catalyst, an aliphatic compound of the formula

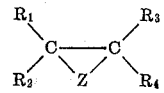

in which $R_1$, $R_2$, $R_3$ and $R_4$ are selected from the group consisting of hydrogen, alkyl containing from 1 to about 18 carbon atoms, aryl containing up to about 10 carbon atoms and haloalkyl containing up to 3 halogen atoms and from 1 to 10 carbon atoms; and Z is selected from the group consisting of oxygen and sulfur, with a phosphorus trihalide, said aliphatic compound being present in amount equal to at least about 3 moles per each mole of said phosphorus trihalide.

The presence of the amine in the above process results in a number of benefits including (1) elimination of side reactions, (2) increased yield, (3) improved reaction start-up, that is reduction in time normally required for reaction to be initiated, (4) attainment of maximum rate of reaction, (5) provision of re-action susceptible of easy control, (6) reduction in fire hazard, normally tending to result from build-up of unreacted reagents such as ethylene oxide, propylene oxide, etc., and (7) provision of products of extremely high purity even when using starting materials of commercial purity in the process on a large scale. Still another novel feature of my invention is that it constitutes a marked departure from the work of prior investigators who have resorted consistently to acid-type catalysts in the preparation of some of the present esters with but moderate success.

The amine used in my process can be any amine capable of forming salts with halogen acids such as HCl. Although polyamines are satisfactory, I prefer to use monoamines and particularly tertiary monoamines as these are especially useful in conducting my process as they are less susceptible of forming complexes or reacting in other ways with the phosphorus halide reagents used. Trialkyl amines are particularly preferred as they result in the greatest overall yield and highest purity of product.

I use catalytic quantities of amines in conducting my process. In other words, my process is conducted in the presence of an amount of amine sufficient to promote both (1) prompt reaction start-up, evidenced by a decided increase in temperature commonly termed a temperature "kick" and (2) completeness of reaction which may be determined by analysis of the product of the reaction, yet insufficient to cause cessation of reaction evidenced by a temperature drop. Generally speaking, the amine catalyst should be mixed with the aliphatic reagent of the above general formula so that the resulting mixture can be caused to react with the phosphorus trihalide. This prevents over-concentration of the catalyst in the reaction vessel thereby avoiding "killing" the reaction. The precise amount of amines so used appears to be dependent at least in part upon the purity of the reactants and is thus not susceptible of uniform numerical definition. Nevertheless, with commercial grade alkylene oxides and sulfides and the other aliphatic compounds of the above formula which are subjected to my process, which compounds are usually of 98 percent purity or higher, the amount of amine used is generally such that there is from about 0.001 to about 0.44 percent by weight of nitrogen present.

Considerable flexibility is provided by this aspect of my invention since I can prepare tri-($\beta$-haloaliphatic)-esters of monomeric acids of either trivalent or pentavalent phosphorus in high yield and purity.

To prepare the above esters of monomeric acid of trivalent phosphorus I employ a preferred embodiment of this invention, namely reacting at a temperature between about 0° and about 100° C. in the presence of an amine as catalyst, an aliphatic compound of the formula

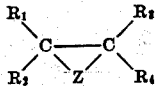

in which $R_1$, $R_2$, $R_3$, and $R_4$ are selected from the group consisting of hydrogen, alkyl containing from 1 to about 18 carbon atoms, aryl containing up to about 10 carbon atoms and haloalkyl containing up to 3 halogen atoms and from 1 to 10 carbon atoms; and Z is selected from the group consisting of oxygen and sulfur, with a trivalent phosphorus trihalide, said aliphatic compound being present in amount equal to at least about 3 moles per each mole of said trivalent phosphorus trihalide. Another embodment of my invention is to conduct a somewhat similar process using a pentavalent phosphorus trihalide in which the phosphorus is doubly bonded to an oxygen or sulfur atom instead of using a trivalent phosphorus trihalide. In this manner, tri-($\beta$-haloaliphatic)-esters of monomeric acids of pentavalent phosphorus are formed. In each instance, the amine catalyst used is as described above and in the amounts above stated.

The trivalent phosphorus trihalides used in preparing tri-($\beta$-haloaliphatic)-esters of monomeric acids of trivalent phosphorus are exemplified by phosphorus trifluoride, phosphorus trichloride, phosphorus tribromide, phosphorus triiodide, phosphorus bromide dichloride, and the like. If desired, mixtures of such compounds may be used. The corresponding esters of the monomeric acids of pentavalent phosphorus are prepared from pentavalent phosphorus trihalides of the formula $X_3P=Z$ where each X is the same or different halogen and Z is oxygen or sulfur. Phosphoryl trifluoride, phosphoryl trichloride, phosphoryl tribromide, phosphoryl triiodide, thionophosphoryl trifluoride, thionophosphoryl trichloride, thionophosphoryl tribromide, thionophosphoryl triiodide, phosphoryl dibromide iodide and thionophosphoryl dichloride bromide serve as examples.

The present embodiments of my invention will be still further apparent from the following illustrative examples in which all parts and percentages are by weight.

EXAMPLE I

The reaction equipment consisted of a reactor equipped with temperature regulating and stirring means. To this reactor continuously flushed with anhydrous nitrogen was charged 1950 parts of phosphorus trichloride of commercial purity. Three parts of triethyl amine was added to 2526 parts of commercial grade 1,2-propylene oxide and the mixture was then introduced into the reactor maintained at 35° C. and atmospheric pressure. The time of addition was regulated such that the total amount of propylene oxide was added after five hours. At the end of this time the mixture was heated for one hour at 35° C. Tri-($\beta$-chloropropyl)-phosphite was obtained in 99 percent yield.

EXAMPLE II

The procedure of Example I was repeated with the exception that 3.5 parts of triethyl amine was used, the pressure was 8 inches of mercury above atmospheric and the cook period was 1.5 hours at 35° C. The yield was over 98 percent.

EXAMPLE III

Using the reaction equipment of Example I, flushed with dry nitrogen gas, 1920 parts of ethylene oxide containing 2.5 parts of trimethyl amine is reacted with 3840 parts of phosphorus tribromide. A six-hour cycle is used while maintaining the temperature at 45° C. A yield of tri-($\beta$-bromoethyl)-phosphite of over 94 percent is obtained.

EXAMPLE IV

The procedure of Example I is repeated except that 3140 parts of 1,2-butylene oxide is reacted with 5830 parts of phosphorus triiodide at a temperature of 55° C. The use of the triethyl amine catalyst enables a yield of tri-($\beta$-iodobutyl)-phosphite exceeding 90 percent.

EXAMPLE V

One hundred sixty parts of phosphorus trichloride and 0.005 parts of triisopropyl amine are charged into the reactor. Two hundred seven parts of 1,2-propylene oxide of commercial purity containing 2.8 parts of tri-isopropyl amine is then introduced into the reactor maintained at a temperature of 35° C. On completion of the reaction the temperature is raised to 60° C. and held there for one hour. A yield of tri-($\beta$-chloropropyl)-phosphite of 96 percent is obtained.

EXAMPLE VI

To 600 parts of stilbene oxide (symmetrical diphenyl ethylene oxide) is added 2.2 parts of triethyl amine. The treated stilbene oxide is then introduced into the reaction vessel containing 271 parts of phosphorus tribromide. The temperature of the vessel is maintained at a temperature of 60° C. and a pressure of 4 inches of mercury above atmospheric during the period of addition of seven hours. At the end of this time the temperature is raised to 70° C. and held there for a period of two hours. Over 85 percent yield of tri-($\beta$-bromo-$\alpha$,$\beta$-diphenylethyl)-phosphite is obtained.

EXAMPLE VII 4 parts of trioctyl amine is added to 221 parts of isobutylene oxide. This mixture is then introduced over a period of five hours into the reaction vessel initially containing 137 parts of phosphorus trichloride. During this period of addition the temperature is maintained at 85° C. After this the temperature is raised to 90° C. where it is held for one additional hour. The product obtained is predominantly tri-($\beta$-chloro-t-butyl)-phosphite.

EXAMPLE VIII

To the reaction vessel is added 137 parts of phosphorus trichloride. 184 parts of 1,2-propylene sulfide containing 0.7 part of dimethyl aniline is then introduced into the reaction vessel over a period of three hours while maintaining a temperature of 30° C. On completion of reaction tri-($\beta$-chloropropyl)-trithiophosphite remains in high yield and purity.

EXAMPLE IX

To the reaction equipment described in Example I is added 270 parts of phosphorus tribromide. 370 parts of styrene oxide containing 0.3 part of dodecyl amine is then introduced into the reactor during a period of four hours while maintaining the temperature at 80° C. and the pressure at eight inches of mercury above atmospheric. After this, the product is heated for two additional hours at 80° C. An appreciable yield of a product containing predominantly tri-($\beta$-bromo-$\alpha$-phenylethyl)-phosphite is obtained.

EXAMPLE X

While maintaining a pressure of ten inches of mercury above atmospheric in the reaction vessel 88 parts of phosphorus trifluoride is charged therein. 0.4 part of aniline is added to 180 parts of ethylene sulfide and this mixture is introduced into the reactor over a period of six hours. During this time, the temperature is maintained at 5° C. After this, the temperature is raised to 35° C. for one additional hour. Tri-($\beta$-fluoroethyl)-trithiophosphite is obtained.

EXAMPLE XI 412 parts of phosphorus triiodide is introduced into the reaction vessel. 0.4 part of di-n-amyl amine is added to 560 parts of epiiodohydrin (3-iodo-1,2-propylene oxide). This mixture is then introduced into the reaction vessel at a rate such that it requires three hours for complete addition. Throughout this time, the temperature is maintained at 90° C. Tri-(β-γ-diiodopropyl)-phosphite is obtained.

EXAMPLE XII

The procedure of Example I is repeated with the exception that 2150 parts of phosphoryl trichloride is used as the phosphorus reagent. A good yield of tri-(β-chloropropyl)-phosphate is obtained.

EXAMPLE XIII

The procedure of Example I is repeated with the exception that 2350 parts of thionophosphoryl trichloride is used as the phosphorus reactant. Tri-(β-chloropropyl)-thionophosphate is obtained.

EXAMPLE XIV

Using the reaction equipment of Example I 180 parts of ethylene sulfide containing 0.2 part of ethanol amine is reacted with 103 parts of phosphoryl trifluoride. A six-hour cycle is used while maintaining the temperature at 30° C. Tri-(β-fluoroethyl)-trithiophosphite is formed.

EXAMPLE XV

To 220 parts of isobutylene oxide is added 0.4 part of N,N-diethyl aniline. The treated isobutylene oxide is then introduced into the reactor charged with 300 parts of thionophosphoryl tribromide over a period of 7 hours. During this time the temperature is maintained at 75° C. The product comprises predominantly tri-(β-bromo-t-butyl)-thionophosphate.

EXAMPLE XVI

To the reactor is charged 150 parts of phosphoryl trichloride. Then is introduced 140 parts of ethylene oxide containing 0.2 part of pyridine, the period of addition being 3 hours. During this time the temperature is maintained at 40° C. and then raised to 80° C. for an additional hour. Tri-(β-chloroethyl)-phosphate is obtained in good yield.

EXAMPLE XVII 280 parts of epichlorohydrin containing 0.2 part of triethyl amine is reacted with 150 parts of phosphoryl trichloride. The epichlorohydrin is introduced over a period of 6 hours into the reaction vessel maintained at a temperature of 45° C. and at a pressure of 10 inches of mercury above atmospheric. Tri-(β-γ-dichloropropyl)-phosphate is obtained in good yield and purity.

EXAMPLE XVIII 370 parts of styrene oxide is reacted with 153 parts of phosphoryl trichloride at a temperature of 50° C. 0.6 part of tri-n-octyl amine is used as catalyst for the reaction which is controlled by adding the styrene oxide containing the amine over a period of 6 hours. Tri-(α-phenyl-β-chloroethyl)-phosphate is formed.

EXAMPLE XIX 220 parts of 2,3-butylene oxide is mixed with 0.3 part of N,N-dimethyl aniline and the mixture introduced into the reactor containing 120 parts of thionophosphoryl trifluoride. The temperature of the reaction is maintained at 5° C. while conducting the reaction at a pressure of 6 inches of mercury above atmospheric. The time of addition of the 2,3-butylene oxide-N,N-dimethyl aniline mixture is 8 hours. Tri-(β-fluoro-sec-butyl)-thiono phosphate is obtained.

The above examples illustrate the modes of conducting the first aspect of this invention. Among the numerous variations which can be used in obtaining the advantages of this invention is the technique of maintaining a "heel" in the reactor of the product of a previous reaction when that product is the same as being prepared. Although such a technique is not essential, it frequently further hastens the start-up of the reaction. Another helpful modification is to add a very small amount of amine catalyst to the phosphorus trihalide reagent contained in the reaction vessel prior to introduction of amine-containing aliphatic reagent as described herein. The amount of amine so used, which is equivalent to about 0.001 percent by weight of nitrogen based on the amount of phosphorus reagent used, promotes still further the initiation of reaction. Other variations will be apparent to one skilled in the art.

My process can be conducted either as a batch or continuous process. For a continuous operation separate streams of phosphorus trihalide and alkylene oxide or sulfide containing amine catalyst are introduced into suitable reaction equipment possessing temperature regulating means such as a heat exchanger. The reactor may be a tubular or coil-type or it may be of the continuous pot-type variety. In operation, the temperature may be controlled within the range of 0° to 100° C. by means of temperature regulating means or the reagent streams may be preheated to reaction temperature prior to introduction into the reactor. Contact time is dependent upon the particular reactants used and the type of reactor and thus falls within the range of about 30 seconds to about one hour. In most cases, a contact time of from 10 to 30 minutes is most satisfactory.

As indicated the amine catalyst in the present aspect of this invention provides tri-(β-haloaliphatic)-esters of monomeric acids of phosphorus of very high purity. This is illustrated by a series of reactions conducted between 1,2-propylene oxide and phosphorus trichloride. Two runs were conducted using the reagents in the amounts and proportions as above stated but without an amine catalyst. One run was conducted at a temperature of 35° C. for a period of 5.9 hours followed by a cook period at 60° C. of one hour. The tri-(β-chloropropyl)-phosphite formed was 91.4 percent pure and contained over 8 percent of various impurities as determined by infra-red analysis. The second run, likewise without amine catalyst, was conducted at a temperature of 60° C. during a period of addition of propylene oxide of 4.75 hours followed by a cook period of one hour at 60° C. The tri-(β-chloropropyl)-phosphite from this run was 90.9 percent pure and contained over 9 percent of impurities. In contrast, two corresponding runs using the same reagents but differing to the extent that triethyl amine was employed as catalyst in the amounts as above stated provided tri-(β-chloropropyl)-phosphite of approximately 97 percent purity. More specifically, a 7 hour reaction between 1,2-propylene oxide and phosphorus trichloride at a temperature of 35° C. followed by a cook period of one hour at 60° C. resulted in tri-(β-chloropropyl)-phosphite of 97.3 percent purity. When the amine catalyst was used in a reaction occurring at 60° C. for a period of 3.6 hours followed by a one-hour cook period at 60° C. the phosphite formed was 96.8 percent pure. The significance of this improved purity of product becomes apparent from the fact that a large proportion of the normally obtained impurities are acidic or potentially acidic and thus are capable of catalyzing decomposition. In severe cases such contamination can result in substantial deterioration of the principal product of the reaction. Moreover, these acidic impurities tend to corrode ferrous metal surfaces so that storage and shipment of such materials is rendered difficult. Generally speaking, the amount of impurities found in my products is less than about 3 percent whereas the same products formed without an amine catalyst or using an acidic type catalyst contain on the average from about 7 to about 20 percent of impurities of a deleterious nature.

Tri-(β-chloropropyl)-phosphite prepared according to the first aspect of this invention and from which is removed trace amounts of volatile impurities, has physical properties as shown in Table I.

Table I

| Temp., °C. | Density, $d_4^t$ | Refractive Index, $n_D^t$ | Viscosity, cp. |
|---|---|---|---|
| 0 | 1.2463 | 1.4827 | 45.20 |
| 20 | 1.2262 | 1.4748 | 15.33 |
| 40 | 1.2061 | 1.4670 | 7.14 |
| 60 | 1.1860 | 1.4591 | 4.07 |

Thus, tri-(β-chloropropyl)-phosphite of this invention has an absolute viscosity corresponding to the equation: log log (cp.+0.6)=11.36401—4.5738 log T where T is the temperature in degrees absolute. The same compound prepared without an amine catalyst and likewise freed from volatile impurities is characterized by an absolute viscosity corresponding to the equation: log log (cp.+0.6)=11.2320—4.5212 log T. Therefore, absolute viscosity between 0° and 60° C. is a convenient means of distinguishing between tri-(β-chloropropyl)-phosphite of this invention and not of this invention. The significance of this is that tri-(β-chloropropyl)-phosphite of this invention is (1) highly pure, (2) non-corrosive to ferrous metals, (3) stable under most conditions (absence of water at high temperature etc.), and (4) capable of substantially quantitative reaction with sulfur. These characteristics are not inherent in tri-(β-chloropropyl)-phosphites not of this invention.

To prepare tri-(β-haloaliphatic)-esters of monomeric thionophosphoric acids, it is preferable to use a two-step reaction. While such compounds can be prepared according to this invention by employing an amine catalyst in a reaction between an aliphatic reagent as described hereinabove and a thionophosphoryl trihalide, there are still greater advantages in forming a tri-(β-haloaliphatic)-ester of a monomeric acid of a trivalent phosphorus in one step and then reacting this ester with sulfur to form the corresponding thionoester. The advantages of conducting such a two-step process include a considerable reduction in cost since phosphorus trihalides and elemental sulfur are cheaper and more available than the corresponding thionophosphoryl trihalide reagents. Moreover, the two-step process provides considerable flexibility in commercial operation as the intermediate phosphite can be prepared on a large scale and by converting a portion of this phosphite to the corresponding thionoester, there results a plurality of products of considerable commercial significance.

A second aspect of this invention, therefore, is a process of preparing a tri-(β-haloaliphatic)-ester of a monomeric thionophosphoric acid which comprises preparing a tri-(β-haloaliphatic)-ester of a monomeric acid of trivalent phosphorus with the use of an amine catalyst as described hereinbefore and reacting the tri-(β-haloaliphatic)-ester of a monomeric phosphorus acid so formed with an approximately stoichiometric amount of sulfur at a temperature between about 40 and about 120° C.

This aspect of my invention reaps the benefits of the presence of the amine catalyst in the first step of the reaction. In other words, the fact that my intermediate phosphites are of such high purity enables almost quantitative reaction with sulfur. On the other hand, I have found from experience that intermediate phosphites prepared without using an amine catalyst or using an acid type catalyst suggested in the art do not approach quantitative reaction with sulfur. This is apparently the result of the presence of substantial quantities of impurities in prior tri-(β-haloaliphatic)-esters of monomeric acids of trivalent phosphorus. The disadvantages of this are obvious. To illustrate, not only is the tri-(β-haloaliphatic)-thionophosphoric ester produced of low purity and thus unsuitable for many of the uses for which it is intended but complex engineering problems are encountered such as the necessity of stringent filtration procedures in an attempt to remove viscous sludges and other solidified decomposition products.

In conducting this aspect of my invention, I have found that a slight excess of sulfur over that required to react with the intermediate phosphite is desirable in that completeness of reaction is thereby effected. In general, this excess is from 0.05 to 0.25 moles of sulfur in excess of theoretical. Although unnecessary, filtration may be used to remove any sulfur which separates on cooling. Use of theoretical quantities of sulfur is also satisfactory.

The following examples wherein all parts and percentages are by weight further illustrate this aspect of my invention.

EXAMPLE XX

To 4362 parts of tri-(β-chloropropyl)-phosphite prepared according to Example I contained in a suitable reactor equipped with stirring and heating means was added 453 parts of sulfur at a rate so as to maintain the temperature between 60 and 68° C. On completion of reaction which required 2 hours, the product was filter-pressed so as to remove unreacted sulfur. It was found that a quantitative reaction had occurred.

EXAMPLE XXI

The procedure of Example XX was repeated with the exception that the temperature of the reaction was allowed to reach 100° C. The reaction time was 2 hours. Again a quantitative yield was noted.

EXAMPLE XXII

The procedure of Example XX was repeated using 311 parts of tri-(β-chloropropyl)-phosphite prepared according to Example II and 33 parts of sulfur. The sulfur was added over a period of 50 minutes whereby the temperature remained at 60 to 65° C. After this, the product of reaction was held for an additional 1.5 hours at 60° C. A quantitative reaction occurred.

EXAMPLE XXIII

The procedure as described in Example XX is repeated using 6230 parts of tri-(β-bromoethyl)-phosphite prepared according to Example III. A quantiative yield of water-white sediment-free tri-(β-bromoethyl)-thionophosphate is obtained.

EXAMPLE XXIV

Using the procedure of Example XX, 360 parts of tri-(β-chloropropyl)-trithiophosphite prepared according to Example VIII is reacted with 32.2 parts of sulfur. A quantitative yield of tri-(β-chloropropyl)-trithiothionophosphate remains after filtration.

A third aspect of this invention relates to an improved process for converting tertiary phosphite and thiophosphite esters in general, and tertiary β-haloaliphatic phosphite and thiophosphite esters in particular to the corresponding thionophosphates. This aspect thus involves a process of preparing a tri-ester of a monomeric thionophosphoric acid which comprises reacting in the presence of an amine as stabilizer and reaction accelerator, a tri-ester of a monomeric acid of trivalent phosphorus with an approximately stoichiometric amount of sulfur at a temperature between about 40 and about 120° C.

As indicated above, because of the high purity of the tri-(β-haloaliphatic)-phosphites prepared according to the first aspect of this invention, I have found it possible to react such esters with sulfur to obtain thionophosphate esters of high purity. However, despite the purity of such phosphites, there is a tendency of hydrolytic degradation to occur at temperatures above about 60° C. which results in the formation of impurities which are incapable of reacting with the sulfur. By this is meant that although the phosphites of this invention are initially very pure, the accumulation in such phosphites of moisture, as from the atmosphere, tends to promote hydrolytic degradation at higher temperatures. In severe cases complete deterioration of the phosphite may occur. Thus if such phosphites are in contact with water at the higher temperatures used to bring about reaction with sulfur this decomposition may be encountered. I have found, however, that the reaction between my phosphite esters, and indeed phosphite esters in general, can be very successfully conducted in the presence of an amine as stabilizer of the type described above. I have found that the use of such amines not only prevents hydrolytic degradation of the intermediate phosphite, whether it be a halogen-free or halogen-containing tertiary phosphite, but accelerates the rate of reaction between the phosphite and the sulfur.

The amount of amine used as stabilizer and reaction accelerator varies depending upon the nature of the phosphite to be reacted with sulfur. In general, however, the full benefits resulting from the presence of the amine in this reaction are obtained when there is an amount of amine present sufficient to substantially completely inhibit hydrolytic degradation. This amount is from about 0.0014 to about 0.2 percent of nitrogen by weight of the phosphite ester reacted with sulfur. In this manner, the additional important advantage of reaction acceleration is provided.

The following examples wherein all parts and percentages are by weight further illustrate this aspect of my invention.

EXAMPLE XXV

The procedure of Example XX was repeated with the exception that the reaction was conducted in the presence of 2.2 parts of triethyl amine. The time required for quantitative reaction was 1 hour.

EXAMPLE XXVI

The procedure of Example XX is repeated using 5.0 parts of tri-n-butyl amine as stabilizer and reaction accelerator. Quantitative reaction occurs after a period of 1 hour.

EXAMPLE XXVII 0.3 part of N,N-diethyl aniline is used as stabilizer and reaction accelerator in reaction between 445 parts of tri-($\beta$-bromoethyl)-phosphite and 32 parts of sulfur at 80° C.

EXAMPLE XXVIII 676 parts of tri-($\beta$-iodobutyl)-trithiophosphite is reacted with 32 parts of sulfur in the presence of 0.4 part of tri-isopropyl amine at a temperature of 110° C.

EXAMPLE XXIX 0.1 part of ethanol amine is added to a reaction vessel containing 415 parts of tri-($\beta$-$\gamma$-dichloropropyl)-phosphite and 32 parts of sulfur. The temperature of reaction is maintained at 55° C.

EXAMPLE XXX 166 parts of triethyl phosphite is reacted at 80° C. with 32 parts of sulfur in the presence of 0.1 part of tri-n-butyl amine.

EXAMPLE XXXI 352 parts of tri-o-cresyl phosphite is reacted at 100° C. with 32 parts of sulfur in the presence of 0.05 part of trimethyl amine.

EXAMPLE XXXII

At a temperature of 45° C. 310 parts of triphenyl phosphite is reacted with 32 parts of sulfur using 0.05 part of triethyl amine as stabilizer and reaction accelerator.

EXAMPLE XXXIII 298 parts of tri-n-butyl trithiophosphite is reacted with 32 parts of sulfur at a temperature of 95° C. in the presence of 0.04 part of pyridine.

EXAMPLE XXXIV 269 parts of tri-($\beta$-chloroethyl)-phosphite is reacted with 32 parts of sulfur at a temperature of 68° C. in the presence of 0.1 part of trilauryl amine.

The preceding illustrative examples exemplify the manner in which the benefits of this aspect of my invention are obtained. In each instance not only is the product of reaction of higher purity than if the amine were absent, but the time of reaction is shortened.

The benefits of this aspect of my invention are obtainable to a considerable degree whether or not the tri-($\beta$-haloaliphatic)-ester of a monomeric acid of trivalent phosphorus is prepared according to the first aspect of this invention. However, it will be apparent that when these aspects of my invention are used conjointly the benefits are magnified very substantially. That is, one aspect of my invention enables the preparation of highly pure halogen-containing tri-esters of aliphatic esters of trivalent phosphorus and the present aspect enables them to be converted quantitatively and without decomposition into useful tri-($\beta$-haloaliphatic)-thionophosphates. Moreover, this second reaction as indicated earlier occurs in less time than is ordinarily required. Thus, a preferred embodiment of this invention is to prepare a tri-($\beta$-haloaliphatic)-ester of a monomeric phosphorus acid using an amine catalyst as described hereinbefore and reacting said ester with an approximately stoichiometric amount of sulfur at a temperature between about 40° C. and 120° C. in the presence of an amine as stabilizer and reaction accelerator. The amount of amine in the second step is sufficient to substantially completely inhibit hydrolytic degradation. This amount is usually such that there is from between about 0.0014 and about 0.2 percent by weight of nitrogen based on the amount of phosphite ester involved in the reaction.

In a broader sense this aspect of my invention relates to reacting sulfur with tertiary phosphite esters which may or may not be substituted in the aliphatic, alicyclic, or aromatic portion of the molecule with halogen. Thus, I can conduct this aspect of my invention using tri-($\beta$-haloaliphatic)-esters of monomeric acids of trivalent phosphorus and also tertiary phosphites and thiophosphites, such as trimethyl phosphite, triethyl phosphite, triisobutyl phosphite, tri-t-butyl phosphite, tri-n-hexyl phosphite, tri-n-decyl phosphite, tri-cyclohexyl phosphite, tri-m-cresyl phosphite, tri-phenyl phosphite, tri-2-ethylhexyl phosphite, trimethyl trithiophosphite, triisoamyl dithiophosphite, tri-(mixed lauryl)-monothiophosphite, tri-phenyl trithiophosphite and the like.

A fourth aspect of this invention relates to a method of treating tri-($\beta$-haloaliphatic)-thionophosphates in particular, and tertiary thionophosphates in general, particularly when such esters are prepared in two stages. That is, the treatment now to be described is most efficacious in the case of thionophosphate esters which have been prepared by reacting tertiary phosphites with sulfur and preferably when such reaction has been conducted in the presence of an amine accelerator and stabilizer.

Tertiary thionophosphate esters when prepared in a two-step reaction dissolve excess sulfur at the temperatures of reaction. Moreover, in spite of filtration or other means of purification commonly used, tertiary thionophosphate esters while initially highly pure tend to gradually but steadily decompose with the liberation of hydrogen sulfide, free sulfur, and other decomposition products. Such decomposition leads to storage problems, notably corrosion; the formation of offensive odors; and the formation of sediments and sludges which are undesirable especially when such esters are to be employed as fuel additives or the like. Such decomposition is particularly prevalent in the case of tri-(β-haloaliphatic)-thionophosphates.

The present aspect of this invention is thus a process of purifying and stabilizing a tri-ester of a monomeric thionophosphoric acid prepared by reacting a tri-ester of a monomeric acid of trivalent phosphorus with an approximately stoichiometric amount of sulfur which comprises contacting said tri-ester of a monomeric acid of thionophosphoric acid with an aqueous solution of an alkali metal hydroxide in amount sufficient to produce a pH of at least about 8 and an alkali metal sulfide in amount sufficient to substantially completely react with unreacted sulfur. For best results I prefer that the pH be about 13 after this treatment, which can be achieved by adding more of the alkali metal hydroxide solution if the system is not already at this pH. By this process tertiary thionophosphates, particularly tri-(β-haloaliphatic)-thionophosphates, of exceedingly high purity are formed by the removal of last traces of dissolved sulfur. Moreover, I have found that such a process in some unexplainable manner produces thionophosphates which show no tendency of deterioration even under long periods of storage.

The alkali metal sulfide used in this aspect of my invention is preferably the sodium sulfide, $Na_2S$, although recourse may be had to the corresponding potassium or other alkali metal sulfides.

The present aspect of this invention while extremely useful when used independently of the other aspects of this invention is preferably used conjointly with such aspects. By so doing, the optimum results of the present invention in toto are achieved. Thus, a preferred embodiment of this invention is to prepare a tri-(β-haloaliphatic)-ester of a monomeric thionophosphoric acid by reacting an aliphatic compound as described hereinbefore with a trivalent phosphorus trihalide in the presence of an amine as catalyst, and reacting in the presence of an amine as stabilizer and reaction accelerator, the tri-(β-haloaliphatic)-ester of a monomeric acid of trivalent phosphorus so formed with sulfur and then contacting the thionophosphate produced with an aqueous solution of an alkali metal hydroxide and an alkali metal sulfide as described above.

The present aspects of this invention will become apparent from the following illustrative examples wherein all parts and percentages are by weight.

EXAMPLE XXXV

Using the reaction equipment as described in Example I, 1950 parts of phosphorus trichloride is charged to the reactor. 3.5 parts of triethyl amine is added to 2526 parts of 1,2-propylene oxide. The propylene oxide so treated is then fed into the reactor on a five hour cycle while maintaining a temperature of 60° C. in the reactor. At the completion of the propylene oxide feed the mixture is cooked for one hour at 60° C. Then 453 parts of sulfur is added to the reaction mixture which is maintained at a temperature of about 65° C. On completion of this reaction the tri-(β-chloropropyl)-thionophosphate formed contains about 0.2 percent of dissolved sulfur. This material is placed in a wash kettle held at a temperature of approximately 60° C. 525 parts of water is added to the product followed by a 50 percent aqueous solution of sodium hydroxide in amount sufficient to produce a pH of the mixture of between 8 and 10. 100 parts of sodium sulfide is then added to the mixture which is then agitated for about one hour. At the end of this time the water layer is decanted and the product washed several times with water followed by decantation. The product is then placed in a still maintained at a temperature between 60 and 70° C. and under 25 inches of mercury vacuum. Air is allowed to pass through the product in the still at a rate such that there is a continuous stream of bubbles in the product. Activated carbon is added in amount sufficient to remove any discoloration and then a filter aid is used to facilitate removal of the carbon. The product is then filtered to remove last traces of solid materials. The yield of product is about 4500 parts amounting to an overall conversion of from 90 to 95 percent.

EXAMPLE XXXVI

Essentially the same purification procedure as described in the previous example is repeated using tri-(β-chloroethyl)-thionophosphate prepared by reacting tri-(β-chloroethyl)-phosphite with a slight excess of sulfur. The tri-(β-chloroethyl)-thionophosphate so treated shows no signs of deterioration after storage for four months.

EXAMPLE XXXVII

A 50 percent aqueous solution of sodium hydroxide is added to 1710 parts of triphenyl thionophosphate prepared by reacting 1550 parts of triphenyl phosphite with 160 parts of sulfur. The amount of the aqueous solution of sodium hydroxide used is sufficient to produce a pH of 10. 75 parts of sodium sulfide is added so that the pH becomes 13. The aqueous layer is then removed by decantation followed by repeated water washings, filtration and drying.

Tri-(β-chloropropyl)-thionophosphate prepared according to this invention as, for example, according to the procedure of Example XXXV is eminently suitable for use as an additive to gasoline because of its high degree of storage stability. To characterize this thionophosphate use can be made of its refractive index which ranges from $n_D^{20}=1.4915$ to $n_D^{20}=1.4926$. In contrast, the same thionophosphate prepared by processes not of this invention has a refractive index of from $n_D^{20}=1.4890$ to $n_D^{20}=1.4910$. Another means of distinguishing the above thionophosphate of this invention from the same ester not of this invention is absolute viscosity. The tri-(β-chloropropyl)-thionophosphate of this invention prepared by the use of an amine and subjected to the caustic-sulfide washing as described earlier has an absolute viscosity at 20° C. of about $cp.^{20}=60.7$ whereas the same ester prepared according without amine catalyst or subsequent caustic-sulfide treatment has a viscosity of about $cp.^{20}=54.3$. By these physical characteristics the tri-(β-chloropropyl)-thionophosphate of this invention which is highly pure and stable can be distinguished from the ester prepared by methods not of this invention which ester is far less stable and thus less suitable especially for use as a fuel additive.

I claim:

1. Process of preparing a tri-(β-haloaliphatic) ester of a monomeric acid of phosphorus which comprises reacting at a temperature between about 0° and about 100° C. and in the presence of a catalytic quantity of a basic amine as catalyst, an aliphatic compound of the formula

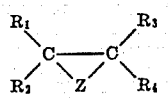

in which $R_1$, $R_2$, $R_3$ and $R_4$ are selected from the group consisting of hydrogen, alkyl containing from 1 to about 18 carbon atoms, aryl containing up to about 10 carbon atoms and haloalkyl containing up to 3 halogen atoms and from 1 to 10 carbon atoms, and Z is selected from the group consisting of oxygen and sulfur; with a phosphorus trihalide selected from the group consisting of trivalent phosphorus trihalides, phosphoryl trihalides, and thionophosphoryl trihalides, said process being further characterized in that said basic amine is selected from the group consisting of alkyl amines, mononuclear aryl amines, organic heterocyclic nitrogen-containing amines and lower alkanol amines and that said aliphatic compound is present in amount equal to at least about 3 moles per each mole of said phosphorus trihalide.

2. Process of preparing a tri-(β-haloaliphatic) ester of a monomeric acid of trivalent phosphorus which comprises reacting at a temperature between about 0° and about 100° C. and in the presence of a catalytic quantity of a basic amine as catalyst, an aliphatic compound of the formula

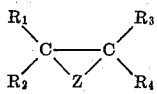

in which $R_1$, $R_2$, $R_3$, and $R_4$ are selected from the group consisting of hydrogen, alkyl containing from 1 to about 18 carbon atoms, aryl containing up to about 10 carbon atoms and haloalkyl containing up to 3 halogen atoms and from 1 to 10 carbon atoms, and Z is selected from the group consisting of oxygen and sulfur; with a trivalent phosphorus trihalide, said basic amine being selected from the group consisting of alkyl amines, mononuclear aryl amines, organic heterocyclic nitrogen-containing amines and lower alkanol amines, and said aliphatic compound being present in amount equal to at least about 3 moles per each mole of said trivalent phosphorus trihalide.

3. The process of claim 2 wherein said basic amine is a trialkyl amine.

4. The process of claim 2 wherein said aliphatic compound is propylene oxide and said trivalent phosphorus trihalide is phosphorus trichloride.

5. Process of preparing a tri-($\beta$-haloaliphatic) ester of a monomeric thionophosphoric acid which comprises reacting at a temperature between about 0° and about 100° C. and in the presence of a catalytic quantity of a basic amine as catalyst, an aliphatic compound of the formula

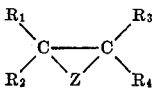

in which $R_1$, $R_2$, $R_3$ and $R_4$ are selected from the group consisting of hydrogen, alkyl containing from 1 to about 18 carbon atoms, aryl containing up to about 10 carbon atoms and haloalkyl containing up to 3 halogen atoms and from 1 to 10 carbon atoms, and Z is selected from the group consisting of oxygen and sulfur; with a trivalent phosphorus trihalide, said basic amine being selected from the group consisting of alkyl amines, mononuclear aryl amines, organic heterocyclic nitrogen-containing amines and lower alkanol amines, and said aliphatic compound being present in amount equal to at least about 3 moles per each mole of said trivalent phosphorus trihalide, whereby a tri-($\beta$-haloaliphatic) ester of a monomeric phosphorous acid is formed, and reacting said last-named ester with an approximately stoichiometric amount of sulfur at a temperature between about 40° and about 120° C. whereby substantially quantitative conversion of said last-named ester to the tri-($\beta$-haloaliphatic) ester of a monomeric thionophosphoric acid is effected.

6. The process of claim 5 wherein said aliphatic compound is propylene oxide and said trivalent phosphorus trihalide is phosphorus trichloride.

7. Process of preparing a tri-($\beta$-haloaliphatic) ester of a monomeric thionophosphoric acid which comprises reacting at a temperature between about 0° and about 100° C. and in the presence of a catalytic quantity of a basic amine as catalyst, an aliphatic compound of the formula

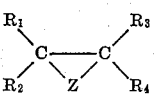

in which $R_1$, $R_2$, $R_3$ and $R_4$ are selected from the group consisting of hydrogen, alkyl containing from 1 to about 18 carbon atoms, aryl containing up to about 10 carbon atoms and haloalkyl containing up to 3 halogen atoms and from 1 to 10 carbon atoms, and Z is selected from the group consisting of oxygen and sulfur; with a trivalent phosphorus trihalide, said basic amine being selected from the group consisting of alkyl amines, mononuclear aryl amines, organic heterocyclic nitrogen-containing amines and lower alkanol amines and said aliphatic compound being present in amount equal to at least about 3 moles per each mole of said trivalent phosphorus trihalide, whereby a tri-($\beta$-haloaliphatic) ester of a monomeric phosphorous acid is formed, and reacting said last-named ester with an approximately stoichiometric amount of sulfur at a temperature between about 40° and about 120° C., in the presence of a basic amine—selected from the group named above—as stabilizer and reaction accelerator.

8. The process of claim 7 wherein said aliphatic compound is propylene oxide and said trivalent phosphorus trihalide is phosphorus trichloride.

9. In the process of preparing a triester of a monomeric thionophosphoric acid which comprises reacting an approximately stoichiometric amount of sulfur with a triester of a monomeric acid of trivalent phosphorus in which the ester portion is selected from the group consisting of alkyl, haloalkyl and mononuclear aryl groups, the improvement in which the reaction is carried out at a temperature between about 40° and about 120° C. in the presence of a small amount of a basic amine selected from the group consisting of alkyl amines, mononuclear aryl amines, organic heterocyclic nitrogen-containing amines and lower alkanol amines, as stabilizer and reaction accelerator.

10. The process of claim 9 wherein said triester of a monomeric acid of trivalent phosphorus is a tri-($\beta$-haloalkyl) ester.

11. Process of preparing a tri-($\beta$-haloaliphatic) ester of a monomeric thionophosphoric acid which comprises reacting at a temperature between about 0° and about 100° C. and in the presence of a catalytic quantity of a basic amine as catalyst, an aliphatic compound of the formula

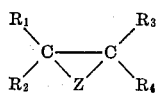

in which $R_1$, $R_2$, $R_3$ and $R_4$ are selected from the group consisting of hydrogen, alkyl containing from 1 to about 18 carbon atoms, aryl containing up to about 10 carbon atoms and haloalkyl containing up to 3 halogen atoms and from 1 to 10 carbon atoms, and Z is selected from the group consisting of oxygen and sulfur; with a trivalent phosphorus trihalide, said basic amine being selected from the group consisting of alkyl amines, mononuclear aryl amines, organic heterocyclic nitrogen-containing amines and lower alkanol amines, and said aliphatic compound being present in amount equal to at least about 3 moles per each mole of said trivalent phosphorus trihalide, whereby a tri-($\beta$-haloaliphatic) ester of a monomeric phosphorous acid is formed, reacting said last-named ester with an approximately stoichiometric amount of sulfur at a temperature between about 40° and about 120° C. in the presence of a basic amine—selected from the group named above—as stabilizer and reaction accelerator, and then contacting the tri-($\beta$-haloaliphatic) ester of a monomeric thionophosphoric acid so formed with an aqueous solution of an alkali metal hydroxide in amount sufficient to produce a pH of at least about 8 and an alkali metal sulfide in amount sufficient to substantially completely react with unreacted sulfur.

12. Process of preparing tri-($\beta$-chloropropyl) thionophosphate which comprises reacting propylene oxide with phosphorus trichloride at a temperature between about 0° and about 100° C. in the presence of a catalytic quantity of a basic amine as catalyst, said basic amine being selected from the group consisting of alkyl amines, mononuclear aryl amines, organic heterocyclic nitrogen-containing amines and lower alkanol amines, said propylene oxide being present in amount equal to at least about 3 moles per each mole of phosphorus trichloride whereby substantially pure tri-($\beta$-chloropropyl) phosphite is formed, reacting said phosphite with an approximately stoichiometric amount of sulfur at a temperature between about 40° and about 120° C. in the presence of a basic amine—selected from the group named above—as stabilizer and reaction accelerator, and then contacting the tri-(β-chloropropyl) thionophosphate so formed with an aqueous solution of an alkali metal hydroxide in amount sufficient to produce a pH of at least about 8 and an alkali metal sulfide in amount sufficient to substantially completely react with unreacted sulfur.

13. The process of claim 2 wherein said aliphatic compound is propylene oxide, said trivalent phosphorus trihalide is phosphorus trichloride and said basic amine is a trialkyl amine.

14. The process of claim 2 wherein said aliphatic compound is propylene oxide, said trivalent phosphorus trihalide is phosphorus trichloride and said basic amine is triethyl amine.

15. The process of claim 5 wherein said aliphatic compound is propylene oxide, said trivalent phosphorus trihalide is phosphorus trichloride and said basic amine is a trialkyl amine.

References Cited in the file of this patent

UNITED STATES PATENTS

| | | |
|---|---|---|
| 1,936,985 | Lommel et al. | Nov. 28, 1933 |
| 2,053,752 | Vobach et al. | Sept. 8, 1936 |
| 2,157,164 | Daly et al. | May 9, 1939 |
| 2,169,185 | Shoemaker et al. | Aug. 8, 1939 |
| 2,520,393 | Fletcher | Aug. 29, 1950 |
| 2,536,647 | Kosolapoff | Jan. 2, 1951 |
| 2,610,978 | Lanham | Sept. 16, 1952 |
| 2,647,140 | Jonas | July 28, 1953 |
| 2,724,719 | Markley et al. | Nov. 22, 1955 |
| 2,741,637 | Welz | Apr. 10, 1956 |

OTHER REFERENCES

Kosolapoff: "Organo-Phosphorus Compounds," New York, John Wiley & Sons, Inc. (1950), pp. 235–6.

Kosolapoff: "Organophosphorous Compounds," New York, John Wiley & Sons, Inc. (1950), pp. 215 and 216 relied on.